United States Patent
Ohishi et al.

(10) Patent No.: US 7,626,686 B2
(45) Date of Patent: Dec. 1, 2009

(54) SURVEYING INSTRUMENT

(75) Inventors: Masahiro Ohishi, Tokyo (JP);
Yoshikatsu Tokuda, Tokyo (JP)

(73) Assignee: Topcon Corporation, Tokyo (JP)

( * ) Notice: Subject to any disclaimer, the term of this patent is extended or adjusted under 35 U.S.C. 154(b) by 0 days.

(21) Appl. No.: 12/063,820

(22) PCT Filed: Jul. 27, 2006

(86) PCT No.: PCT/JP2006/314875

§ 371 (c)(1),
(2), (4) Date: Jun. 16, 2008

(87) PCT Pub. No.: WO2007/020780

PCT Pub. Date: Feb. 22, 2007

(65) Prior Publication Data

US 2009/0046272 A1  Feb. 19, 2009

(30) Foreign Application Priority Data

Aug. 15, 2005 (JP) ............................ 2005-235287

(51) Int. Cl.
*G01C 3/08* (2006.01)
(52) U.S. Cl. ................................... 356/5.01
(58) Field of Classification Search ........ 356/3.01–28.5
See application file for complete search history.

(56) References Cited

U.S. PATENT DOCUMENTS 6,469,778 B2   10/2002   Asaka et al.
2005/0269489 A1*  12/2005   Taverner ................. 250/227.14
2006/0103850 A1*   5/2006   Alphonse et al. ............ 356/479
2007/0024869 A1*   2/2007   Ostrovsky et al. ........... 356/511

FOREIGN PATENT DOCUMENTS

| EP | 0 596 614 A2 | 5/1994 |
|---|---|---|
| JP | 59-088673 A | 5/1984 |
| JP | 05-232230 A | 9/1993 |
| JP | 05-297140 A | 11/1993 |
| JP | 06-265636 A | 9/1994 |
| JP | 9-211128 A | 8/1997 |
| JP | 2000-206246 A | 7/2000 |
| JP | 2001-201573 A | 7/2001 |

* cited by examiner

*Primary Examiner*—Thomas H Tarcza
*Assistant Examiner*—Luke D Ratcliffe
(74) *Attorney, Agent, or Firm*—Foley & Lardner LLP

(57) ABSTRACT

To provide a surveying instrument for measuring difference in required time of light or distance to an object to be measured while covering a wide dynamic range without adjusting light amount. A light pulse emanating from a light emitting section 1 is divided into a reference light cast to a reference light path F1 and a measurement light cast to a measurement light path F2 through which the measurement light travels to and is reflected back from the object to be measured. These two light beams are received with a light receiving section 9. With a multiplex reflection optical fiber Mp1 interposed in the middle of the measurement light path F2, the measurement light comes out as a row of multiplex light pulses attenuating successively in light amount at a constant rate. From this row of pulses, a measurement light of approximately the same in received light level as the reference light may be selected. Based on the selected measurement light and the reference light, the difference between the time required for the measurement light traveling through the measurement light path F2 and the time required for the reference light traveling through the reference light path F1, or the distance to the object to be measured, is measured.

11 Claims, 10 Drawing Sheets

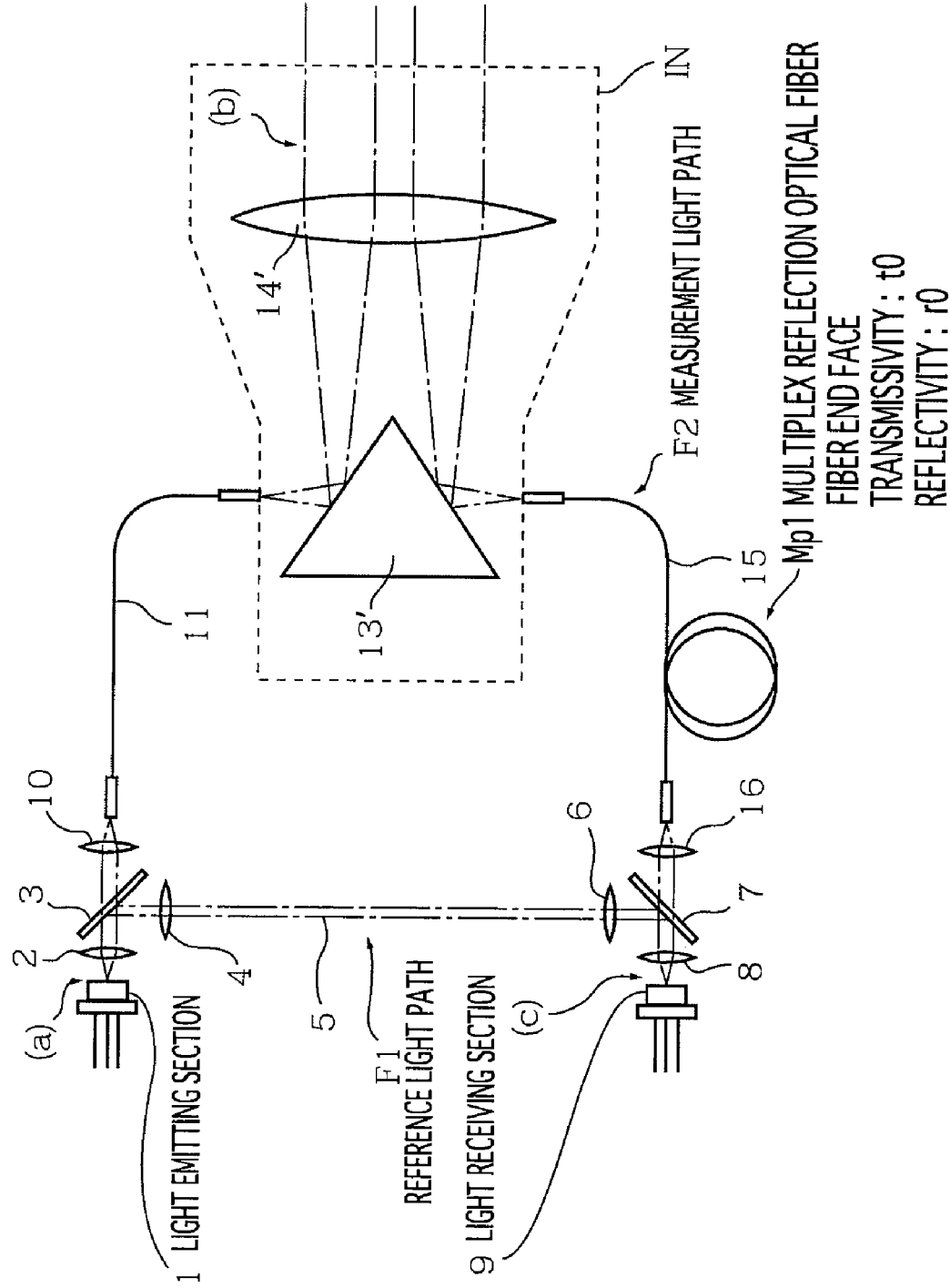

FIG. 8

| AMPLITUDE RATIO | COMPENSATION AMOUNT (in mm) |
|---|---|
| 0.5 | -338.4 |
| 0.6 | -205.2 |
| 0.7 | -76.8 |
| 0.8 | -36.0 |
| 0.9 | -7.2 |
| 1.0 | 0 |
| 1.1 | +13.2 |
| 1.2 | +18.0 |
| 1.3 | +27.6 |
| 1.4 | +32.4 |
| 1.5 | +44.4 |
| 1.6 | +51.6 |
| 1.7 | +56.4 |
| 1.8 | +62.4 |
| 1.9 | +69.6 |
| 2.0 | +80.4 |

SURVEYING INSTRUMENT

TECHNICAL FIELD

This invention relates to a surveying instrument. More specifically, this invention relates to a surveying instrument that receives light pulses reflected from an object or a target to be measured and determines time difference (time lag) or distance.

BACKGROUND ART

Such instruments are conventionally known that measure time difference or distance by receiving light pulses reflected from a target or object to be measured. Generally the amount of received light varies greatly according to the distance to the object to be measured. There have been the following problems. In such a case as when the object to be measured is at a great distance, amplification of received light amount is required. On the other hand, in such a case as when the object to be measured is at a very small distance, light intensity of reflected light pulses in the measurement light path is very high, and as a result, the high intensity remaining as it is causes measurement error due to saturation of received light signals.

Because the change in the intensity of received light signal produces measurement error in the course of processing the received light signal, attempts have been made to provide a reference light path for removing influences of light emission time difference at the light emitting section and of the difference in the received light signal processing circuit. In order to carry out particularly high precision measurements, it is preferable that the received light amount (received light level) is approximately the same in both the measurement light path and the reference light path. Therefore, the following methods are known: a method using a light amount adjusting device such as an ND filter (neural density filter; dimming filter) in the reference light path; and a method in which a plural number of pulses of different intensities are emitted and separately used for a short distance measuring system (using a low reflection mirror) and for a long distance measuring system (Refer to for example Patent Document 1).

[Patent Document 1]
JP-A-2000-206246; par. 0016-0024 and FIGS. 1 to 7

DISCLOSURE OF INVENTION

Problems to be Solved by the Invention

To measure time difference and distance at high speeds, it is necessary to do so without the light amount adjustment. However, dropping the light amount adjustment invites a problem that as the amount of received light varies greatly with the distance to the object to be measured, a very wide dynamic range is required to receive all the amount of light.

Even if a method is used in which the light pulses of different intensities are used separately for the short distance measuring system (using a low reflection mirror) and long distance measuring system, the dynamic range is not wide enough to cover the entire demand for measurements.

Another fact is that the dynamic range of an electric circuit for the received light processing is generally not so wide enough as to cover the dynamic range of light. Therefore, another problem is that the measurement range without light amount adjustment is singly determined by the dynamic range of the electric circuit.

The object of the invention is to provide a surveying instrument that makes it possible to solve the above problems, or to measure time difference or distance while covering a wide dynamic range without adjusting the light amount.

Means for Solving the Problem

To solve the above problem, a surveying instrument according to the present invention comprises for example as shown in FIG. 1: a light emitting section 1 for emitting light a pulse; a beam splitter 3 for branching the light pulse emitted from the light emitting section 1 into a reference light and a measurement light; a reference light path F1 for letting the reference light travel through; a part of a measurement light path F2 for letting the measurement light travel through for irradiation on an object to be measured and letting the measurement light reflected from the object to be measured travel through, the part of the measurement light path F2 having a multiplex pulse generating section MP1 (See FIG. 1) for generating, from the measurement light, multiplex light pulses at different times with different intensities; a light receiving section 9 for receiving the reference light from the reference light path F1 and receiving the multiplex light pulses from the measurement light path F2; a light coupler 7 for coupling together the light from the reference light path F1 and the light from the measurement light path F2 to guide the light from the reference light path F1 and the light from the measurement light path F2 to the light receiving section 9; a pulse selecting section 38 for selecting, from the multiplex light pulses received with the light receiving section 9, a light pulse for use in measurement; and a measurement amount calculating section 39 for calculating, according to the difference in light receiving time between the light pulse (included in the measurement light) selected with the pulse selecting section 38 and the reference light and according to the order of receiving the selected light pulse, a difference in required time between the time required for the measurement light traveling through a normal measurement light path and the time required for the reference light traveling through the reference light path F1, or for calculating a distance to the object to be measured.

Here, the term "surveying instrument" is assumed to include, in addition to instruments for measuring distance and direction, instruments for measuring the time difference due to light travel and the time difference in receiving light. As the measurement light path F2 extends from the interface section IN to the object to be measured, the term "part of the measurement light path F2" is assumed to exclude the part outside the instrument. The term "multiplex light pulses" is meant to be a group of light pulses formed in a row generated from a single light pulse. The term "order of received light pulses" means the order in which light pulses are received. When only one multiplex pulse generating section Mp1 is used, the order of received light pulses is known by adding one to the order of generation. Therefore, the order of generation is convertible into the order of reception, and can be substantially used as the order of reception. In other words, the order may be counted in the order of generation of the multiplex pulses generated in the multiplex pulse generating section MP1. The term "normal measurement light path" means a measurement light path free from time difference due to reflection at the fiber end surface or bypassing, that is, the measurement light path that is the shortest in optical distance. Sections such as the pulse selecting section 38 and the measurement amount calculating section 39 may not necessarily be of an integral constitution; for example, a computer used for calculation may be separate from an electric circuit. Constituting in this way can provide an instrument for measuring time difference or distance without light amount adjustment while covering a wide dynamic range.

In the surveying instrument as above, the multiplex light pulses generated at different times with different intensities may preferably be a row of pulses appearing at constant time intervals with their light amount sequentially attenuating at a constant rate.

The terms "constant time intervals" and "constant rate" are used herein to mean "substantially constant time intervals" and "substantially constant rate" in consideration of tolerances in manufacture and assembly of instruments. Constituting in this way enables systematic correlation between the intensity and order of generating light pulses, which is convenient for selecting light pulses used for measurement and facilitates automation of light receiving process and calculation.

In the surveying instrument as above, the pulse selecting section 38 for example as shown in FIG. 3 may select the light pulse for use in the measurement according to light levels of the received multiplex light pulses.

The term "to select according to received light level" typically means selecting measurement light of approximately the same in received light amount (received light level) as the reference light. Constituting in this way makes it possible to select measurement light approximately the same in received light amount as the reference light, minimize measurement error, or facilitate compensation with high precision.

In the surveying instrument as above, the multiplex pulse generating section for example as shown in FIG. 1 may have a multiplex reflection optical fiber MP1 with each of its end faces having a reflecting part that lets part of incident light beam travel through while reflecting part of it.

Constituting in this way makes it possible to generate a row of pulses with light amount attenuating at a constant rate and select from the row of pulses a measurement light approximately the same in received light level as the reference light.

In the surveying instrument as above, the reflecting part of the multiplex reflection optical fiber MP1 may preferably be formed with a filter of a specified reflectivity.

Here, the filter of a specified reflectivity is typically produced by end surface coating. The reflectivity is designed to a desired value such as 50% by adjusting for example the coating film thickness. Constituting in this way makes it possible to freely set the attenuation rate of received light amount by adjusting the reflectivity $r_o$ and the transmissivity $t_o$ at the end surface of the multiplex reflection optical fiber Mp1. Therefore, it is possible to design the multiplex reflection optical fiber Mp1 such that a pulse approximately the same in light amount as the basis-setting reference light is present in a row the pulses.

In the surveying instrument as above, the specified reflectivity may preferably be set depending on the relationship to a dynamic range of the instrument.

Constituting in this way makes it possible to design the reflectivity at the end surface of the multiplex reflection optical fiber Mp1 such that light approximately the same in light amount as the basis-setting reference light is present without fail according to the dynamic range of the received light processing system of this surveying instrument.

In the surveying instrument as above, multiplex pulse generating section may preferably have a bypass for bypassing part of incident light beam.

Constituting in this way makes it possible to generate a row of pulses with light amount attenuating sequentially at a constant rate and select from the row of pulses a measurement light approximately the same in received light level as the reference light.

In the surveying instrument as above, the multiplex pulse generating section Mp2 for example as shown in FIG. 9 may preferably branch part of the light beam off the normal measurement light path through a partially reflecting mirror 43, route the branched light beam through the bypass 47, and guide the light beam back to the normal measurement light path through the partially reflecting mirror 43.

Constituting in this way makes it possible to make the light energy use efficiency substantially 100%.

In the surveying instrument as above, the multiplex pulse generating section Mp3 for example as sown in FIG. 10 may preferably branch part of the light beam from the normal measurement light path to the bypass 54 made of an optical fiber loop through a light coupler 53, let the branched light beam travel round through the optical fiber loop 54, and guide the light beam back to the normal measurement light path through the light coupler 53.

Constituting in this way makes it possible to make the light energy use efficiency substantially 100%.

In any one of the surveying instruments as above, the measurement amount calculating section 39 may have a compensation table storing compensation data corresponding to light level of the received light, and use the compensation table to compensate the difference in required time or the distance to the object to be measured.

The term "compensation data corresponding to the received light level" means for example data representing correlation between light amount difference or amplitude ratio (ratio of peak values) and the compensation amount. Constituting in this way makes it possible to calculate strict light amount difference or amplitude ratio between the reference light and the measurement light, and to compensate errors in time difference or distance occurring due to the difference in the light amount with high precision.

In any one of the surveying instruments as above, the object to be measured may be a target.

Constituting in this way makes it possible to carry out efficient and high precision surveying using a target. Here, the term "target" means a marking attached to an object to be measured in surveying to determine with high precision the position and shape of the object.

EFFECT OF THE INVENTION

This invention can provide an instrument for measuring time difference or distance without light amount adjustment while covering a wide dynamic range.

This application is based on the Patent Application No. 2005-235287 filed on Aug. 15, 2005 in Japan, the contents of which are hereby incorporated in its entirety by reference into the present application, as part thereof.

The present invention will become more fully understood from the detailed description given hereinbelow. However, the detailed description and the specific embodiment are illustrated of desired embodiments of the present invention and are described only for the purpose of explanation. Various changes and modifications will be apparent to those ordinary skilled in the art on the basis of the detailed description.

The applicant has no intention to give to public any disclosed embodiment. Among the disclosed changes and modifications, those which may not literally fall within the scope of the patent claims constitute, therefore, a part of the present invention in the sense of doctrine of equivalents.

The use of the terms "a" and "an" and "the" and similar referents in the context of describing the invention (especially in the context of the following claims) are to be construed to cover both the singular and the plural, unless otherwise indicated herein or clearly contradicted by context. The use of any and all examples, or exemplary language (e.g., "such as") provided herein, is intended merely to better illuminate the invention and does not pose a limitation on the scope of the invention unless otherwise claimed.

BRIEF DESCRIPTION OF DRAWINGS

FIG. 6 shows an optical circuit constitution example as a second embodiment of the invention.

FIG. 8 shows a compensation table example in a fourth embodiment.

[Description of Reference Numerals and Symbols]

Figure 1:
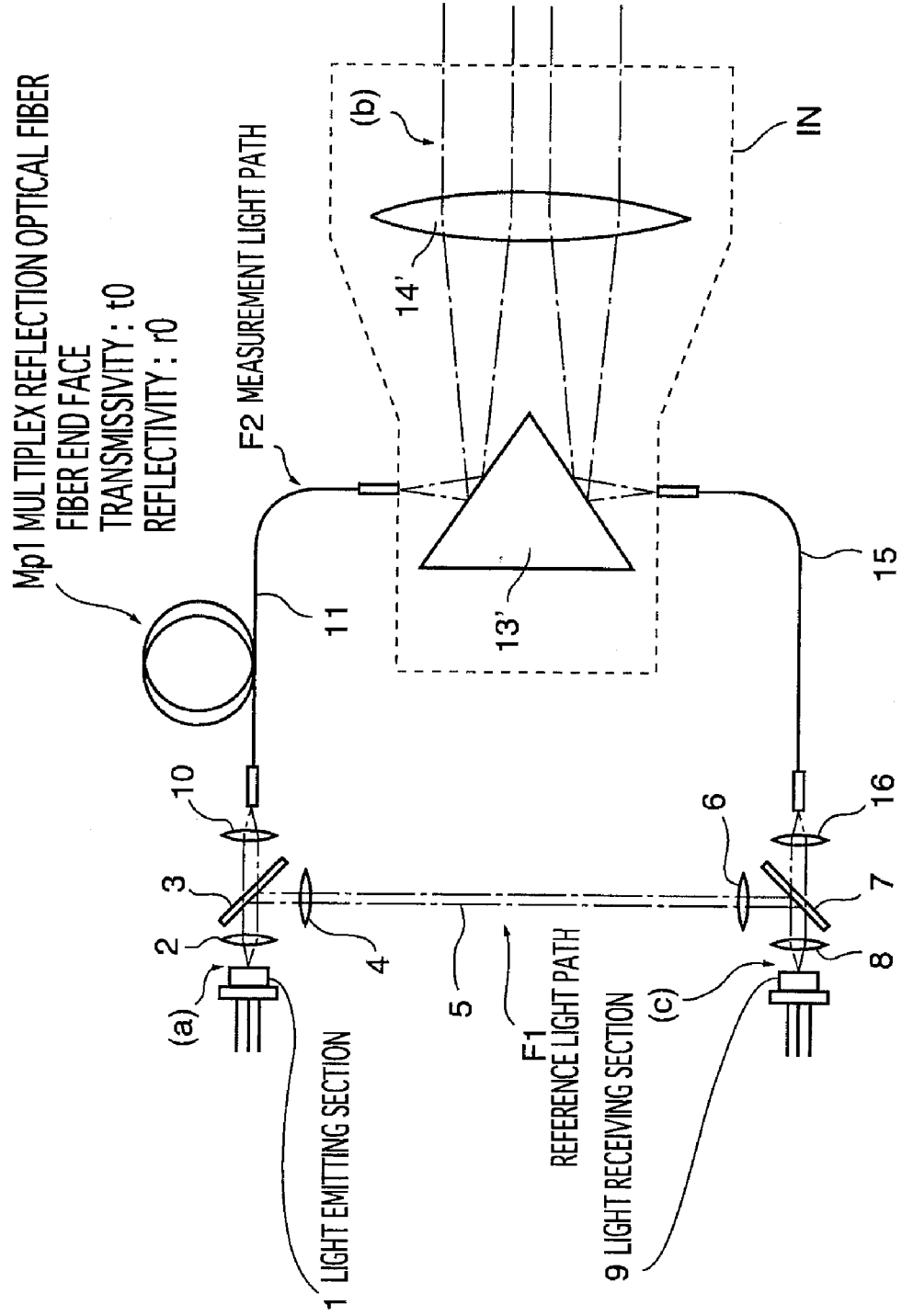
FIG. 1 shows an optical circuit constitution example as a first embodiment of the invention.

| | |
|---|---|
| 1: | light emitting section (PLD) |
| 2: | collimating lens |
| 3: | light separator (beam splitter) |
| 4: | condenser lens |
| 5: | reference fiber |
| 6: | lens |
| 7: | light coupler (beam splitter) |
| 8: | lens |
| 9: | light receiving section (APD) |
| 10: | condenser lens |
| 11: | light emitting fiber |
| 12: | lens |
| 13, 13': | mirror |
| 14, 14': | lens |
| 15: | light receiving fiber |
| 16: | lens |
| 17: | load |
| 18: | preamplifier |
| 19: | comparator |
| 20: | received light processing section |
| 21: | calculating circuit section |
| 22: | reference clock generating circuit |
| 23: | reference sine-cosine signal generating circuit |
| 24: | A-D converter |
| 25: | first memory |
| 26: | number of waves counter-interrupt generating circuit |
| 27: | address counter |
| 28: | first delay circuit |
| 29: | light amount detecting A-D converter |
| 30: | second memory |
| 31: | second delay circuit |
| 32: | peak holding circuit |
| 33: | calculating section |
| 34: | CPU (central processing unit) |
| 35: | driving section |
| 36: | PLD driver |
| 37: | bias adjuster |

-continued

[Description of Reference Numerals and Symbols]

| | |
|---|---|
| 38: | pulse selecting section |
| 39: | measurement amount calculating section |
| 41: | input fiber |
| 42: | collimating lens |
| 43: | semitransparent mirror (partially reflection mirror) |
| 44: | condenser lens |
| 45: | output fiber |
| 46: | condenser lens |
| 47: | feedback fiber (bypass) |
| 48: | collimating lens |
| 51: | input fiber |
| 52: | output fiber |
| 53: | light coupler |
| 54: | optical fiber loop |
| 100: | surveying instrument |
| a1n: | n-th measurement light timing signal data address in the first memory |
| a2n: | sampled peak holding value address in the second memory |
| Dsx: | reference sine (SIN) signal data |
| Dcx: | reference cosine (COS) signal data |
| F1: | reference light path |
| F2: | measurement light path |
| IN: | interface section |
| L: | distance to the object to be measured |
| Lf: | optical fiber length of multiplex reflection light fiber |
| Lm: | rough distance |
| Mn: | number of clocks |
| Mp1: | multiplex reflection optical fiber |
| Mp2, Mp3: | multiplex pulse generating section |
| n: | ordinal number of measurement light timing signal |
| $o_1, o_2, o_3$: | measurement light signal |
| Pa: | emitting light pulse |
| Pb: | output pulse from objective lens |
| Pc: | received light pulse |
| Pr, P1, P2: | output from peak holding circuit |
| r', $o'_1, o'_2$: | timing signal |
| r: | reference light signal |
| $r_0$: | reflectivity |
| T: | total number of timing signals |
| $t_0$: | transmissivity |

BEST MODE FOR CARRYING OUT THE INVENTION

FIG. 1 shows an optical circuit constitution example as a first embodiment of the invention.

The basic concept of this embodiment will be described in reference to FIG. 1. A light beam from a light emitting section, a PLD (light emitting diode) 1, is made into a parallel beam through a collimating lens 2, enters a beam splitter (light separator) 3, and split into an external measurement light beam (measurement light) and an internal measurement light beam (reference light). The reference light reflected with the beam splitter 3 is gathered with a condenser lens 4, passes through a reference fiber 5, converted with a lens 6 again into a parallel light beam, and enters a beam splitter 7 serving as a light coupler. The light beam reflected with the beam splitter 7 is gathered with a lens 8 onto a light receiving section or an APD (avalanche photodiode) 9. Here, the light path from the PLD 1 through the beam splitter 3, the reference fiber 5 and the lens 8 up to the APD 9 is called the reference light path F1. The period of time in which the reference light is received is used as the reference time.

On the other hand, the measurement light passing through the beam splitter 3 is gathered with a condenser lens 10 onto a light emitting fiber 11. A multiplex reflection fiber Mp1 is used as the light emitting fiber 11. The multiplex reflection optical fiber Mp1 is made by processing (such as coating) the end surfaces of an optical fiber, with transmissivity $t_o$ and reflectivity $r_0$ intentionally set. The transmissivity $t_o$ and reflectivity $r_0$ may be set to intended values for example by adjusting the coating film thickness. For example, assuming that both ends of an optical fiber have a transmissivity $t_o$ of 50% and reflectivity $r_0$ of 50%, if a light beam of a single pulse of a light amount of 100 enters the fiber, in addition to the pulse that passes through directly, a row of pulses appear as output after reciprocating between the both end surfaces, with their light amount sequentially attenuating at a constant rate, such as 25, 6.25, 1.56, 0.39, etc. When the multiplex reflection optical fiber Mp1 is used as the light emitting fiber 11, the single pulse emitted from the light emitting section 1 passes through the multiplex reflection optical fiber Mp1, and comes out as a row of pulses sequentially attenuating at a constant rate, with the multiplex reflection optical fiber Mp1 serving as a multiplex pulse generating section. Incidentally, in the interface section IN (included in the instrument) for exchanging measurement light between the instrument and object to be measured, the numeral 13' indicates a mirror; and 14', a lens.

When the light emitting fiber 11 is made long enough relative to the reference fiber 5, the former may be made to function as a delaying fiber for time-wise delaying the measurement light relative to the reference light, so as to make the pulse interval of the row of pulses long enough. It is also possible to provide mixing function for removing unevenness and speckles in the light source.

The exit light from the light emitting fiber 11 is guided out of the instrument and cast to an object to be measured such as a target (not shown). The light reflected from the object to be measured becomes a row of pulses with their light amount attenuating sequentially at a constant rate. The measurement light reflected from the object to be measured is gathered onto a light receiving fiber 15. The measurement light having passed through the light receiving fiber 15 is converted through a lens 16 into a parallel light beam which passes through the beam splitter 7 and is gathered with the lens 8 onto the light receiving section APD 9. Here, the light path from the PLD1 through the beam splitter 3, the light emitting fiber 11, to and from the object to be measured, through the light receiving fiber 15, the lens 8, and to the APD 9, is called the measurement light path F2.

Figure 2A:
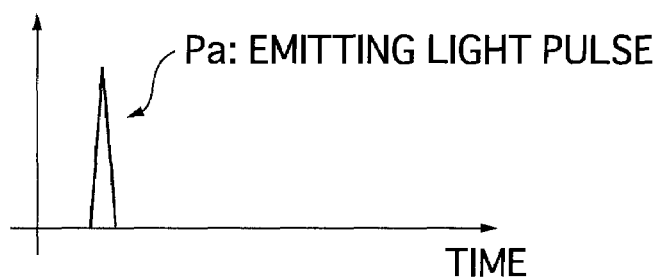
FIG. 2A through 2C show the state of light pulses in the light path in the first embodiment.
Figure 2B:
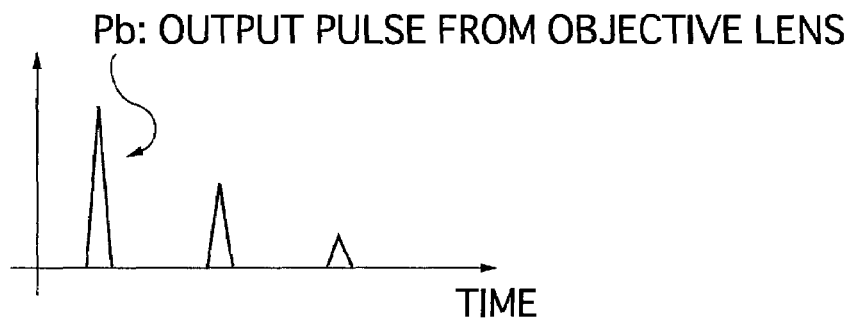
Figure 2C:
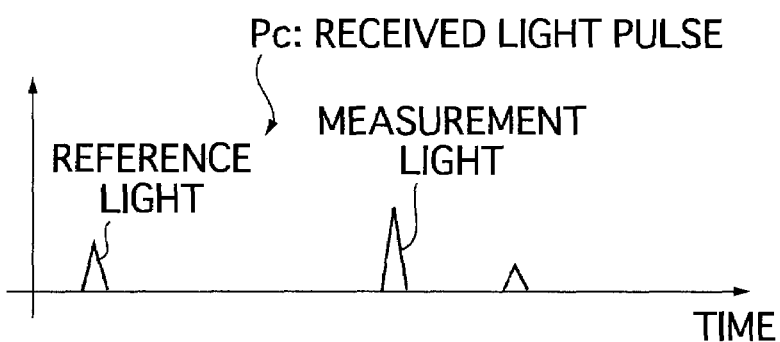

FIG. 2 shows the state of light pulses at each part of the optical circuit. As shown in FIG. 2A, the emitting pulse Pa emanating from the light emitting section 1 is a single pulse. As shown in FIG. 2B, the output pulse from objective lens Pb emitted from the light emitting fiber 11 to the object to be measured becomes a row of pulses with their light amount attenuating sequentially at a constant rate. As shown in FIG. 2C, the received light pulse Pc received with the light receiving section 9 appears first as a single pulse that has passed through the reference light path F1 followed by a row of pulses reflected from the object to be measured, with their light amount attenuating sequentially at a constant rate. Therefore, it is possible to select, as the measurement light, one pulse that is nearest in light amount to the basis-setting reference light, out of the row of pulses (measurement light), so that time difference or distance may be measured without light amount adjustment.

The received light amount attenuation rate may be freely adjusted by adjusting the reflectivity $r_0$ and the transmissivity $t_o$ at the end surface of the multiplex reflection optical fiber Mp1. Therefore, it is possible to design the multiplex reflection optical fiber Mp1 such that the row of pulses contain one pulse close in light amount to the basis-setting reference light. In this way it is possible to constitute a surveying instrument for measuring time difference or distance that can detect a pulse of a light amount optimum for a finite dynamic range the received light processing system has and cover without adjustment all the wide dynamic range of light reflected from the target.

It is possible to determine the distance to the object to be measured (distance to be measured) L by determining the difference in required time between the time taken for the measurement light traveling through the measurement light path F2 and the time taken for the reference light traveling through the reference light path F1. In the case the length of the reference fiber 5 in the reference light path F1 is equal to the sum of the length of the light emitting fiber 11 and the length of the light receiving fiber 15 in the normal measurement light path, the above difference in required time is equal to the light receiving time difference between the light receiving time at which the measurement light is received and the reference time at which the reference light is received. Therefore, it is possible to determine the distance to be measured L by determining the light receiving time difference. Details of calculating the distance to be measured L will be described later.

Figure 3:
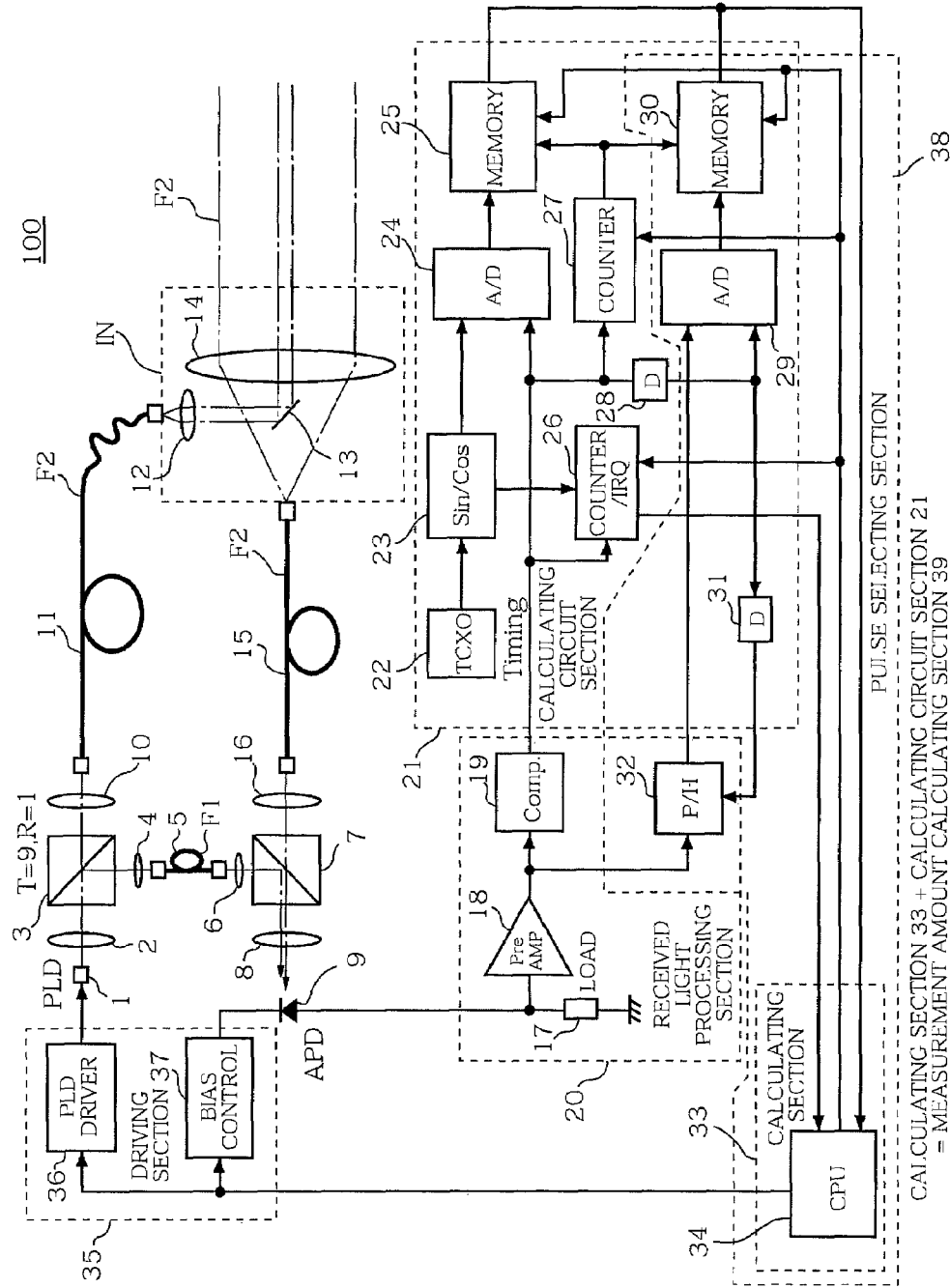
FIG. 3 shows a block diagram of an instrument constitution example in the first embodiment of the invention.

FIG. 3 shows a block diagram of an example constitution of a surveying instrument 100 as the first embodiment of the invention. The optical circuit constitution with the light emitting section 1, the light receiving section 9, the reference light path F1, the light emitting fiber 11, the light receiving fiber 15, etc. is the same as that in FIG. 1. The exit light emitted from the light emitting fiber 11 in the interface section IN is collimated with the lens 12, reflected with the mirror 13, guided out of the surveying instrument, and cast onto the object to be measured (not shown). The measurement light reflected with the object to be measured is gathered through the lens 14 onto the light receiving fiber 15.

Figure 4:
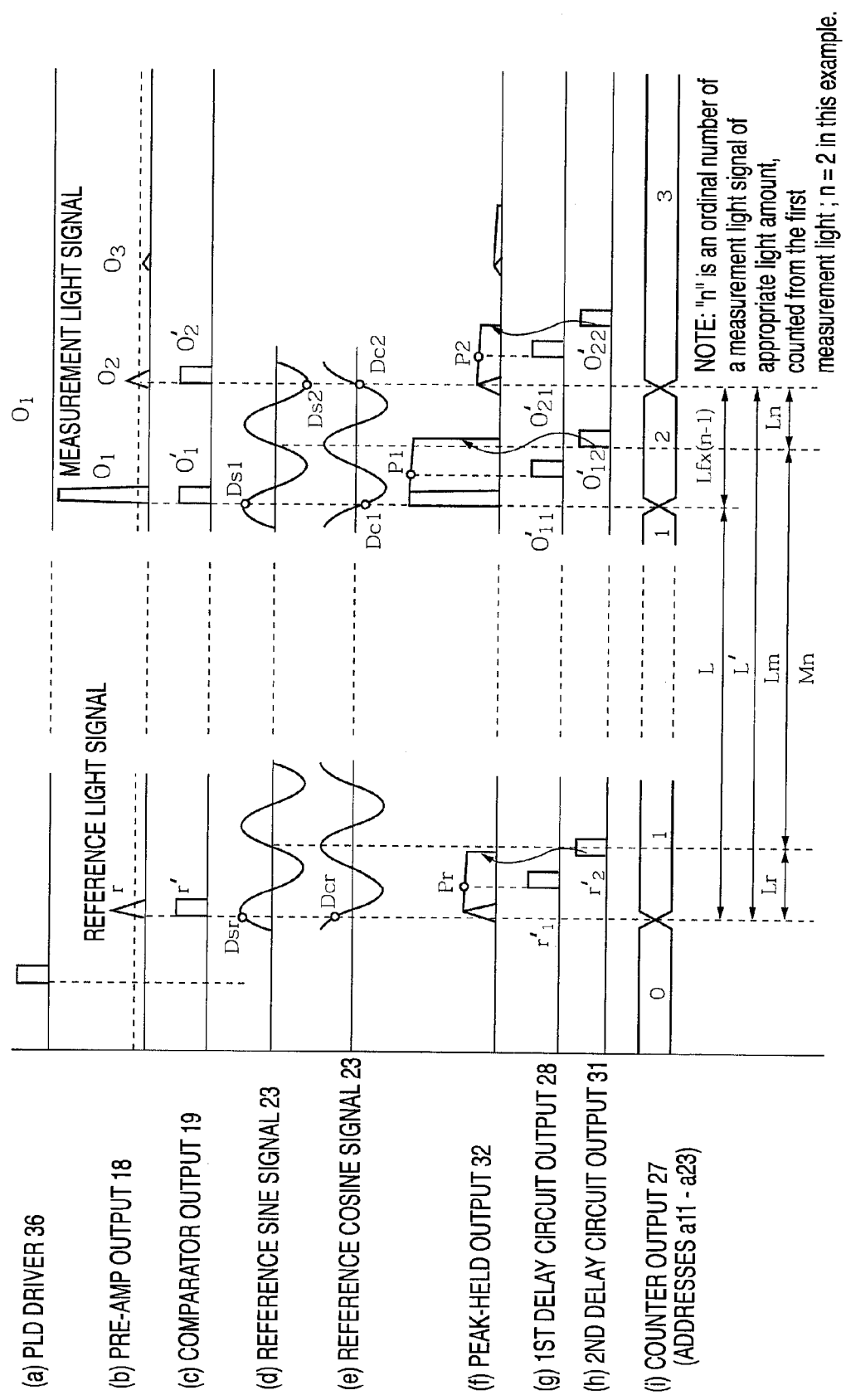
FIG. 4 shows the state of signals at various parts of the instrument after receiving light.

FIG. 4 shows the state of signals at various parts of the surveying instrument 100 after receiving light. Various parts (a) to (i) of the instrument are shown on the left hand in FIG. 4. The horizontal axis represents time. With respect to time, signals related to the reference light are shown on the left hand in FIG. 4; and signals related to the measurement light, on the right.

Figure 5:
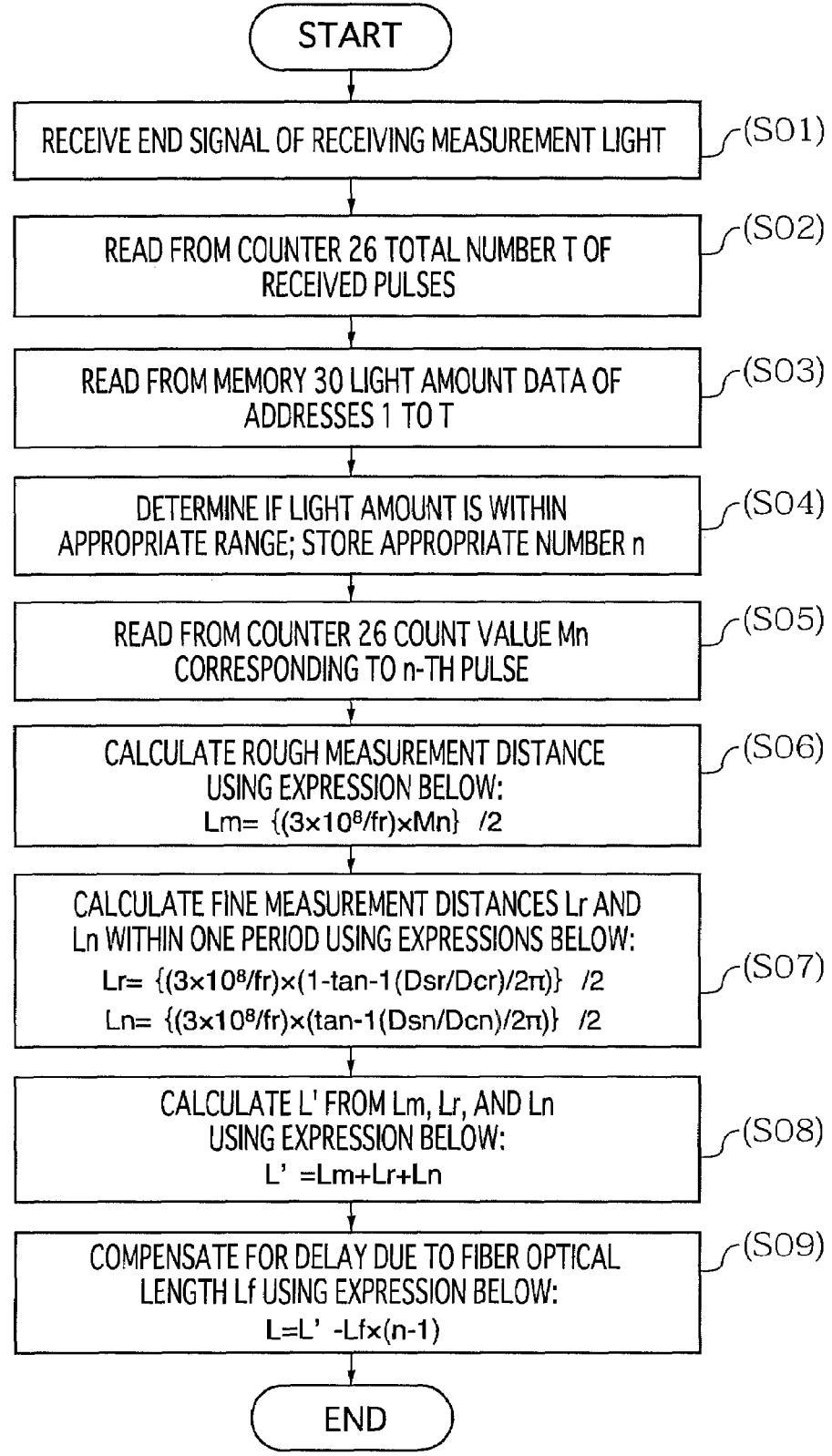
FIG. 5 shows a process flow example of measurement amount calculation in the first embodiment.

FIG. 5 shows a process flow example of measurement amount calculation in the embodiment. The process after receiving light will be described in reference to FIGS. 3 through 5.

First, how to receive light and generate timing signals will be described.

A driving section 35 is made up of a PLD driver 36 for driving the light emitting section PLD1, a bias adjuster 37 for adjusting the bias of the light receiving section APD 9, etc. The PLD1, driven with the PLD driver 36, generates a single pulse as shown in FIG. 4(a). The bias adjuster 37 generates an inverse bias voltage corresponding to the amplification rate of the APD 9. A received light processing section 20 is a device that processes the received light signals the APD 9 receives before the signals are processed with the calculating circuit section 21, and is made up of: a load 17, a preamplifier 18, a comparator 19, a peak holding circuit 32, etc. A received signal is cast to the APD 9, amplified by an amplification rate determined with the bias adjuster 37, and converted into an electric signal. The output from the APD 9 is converted from current to voltage with the load 17, and further amplified with the preamplifier 18. Received light signals appear as shown as the output of the preamplifier 18 in the order of the reference light signal followed by the measurement light signal. The measurement light signals, as they pass through the multiplex reflection optical fiber Mp1 placed on the light emitting side, become a plural number of signals (3 in the figure: $o_1, o_2, o_3$) as shown in FIG. 4(b), with their light amount attenuating at a constant rate.

The reference light signal r and the measurement light signals $o_1, o_2, o_3$ are converted with the comparator 19 respectively into digital timing signals r', $o'_1$, $o'_2$ as shown in FIG. 4(c). The circuit may be designed for the output signals r', $o'_1$, $o'_2$ of the comparator 19 to generate a desired pulse width and alleviate restriction on the calculating circuit section 21 in the succeeding stage. Incidentally, the multiplex reflection optical fiber Mp1 may be designed to produce desired pulse intervals. In this stage, of the signals outputted from the preamplifier 18 and inputted to the comparator 19, signals such as $o_3$ not exceeding the threshold level preset with the comparator 19 are removed as inappropriate for measurements.

The calculating circuit section 21 is made up of: a reference clock generating circuit 22, a reference sine-cosine signal generating circuit 23, an A-D converter 24 with two circuits (for reference sine-cosine signals), a first memory 25, a wave number counter/interrupt generating circuit 26, an address counter 27, a first delay circuit 28, a light amount detecting A-D converter 29, a second memory 30, etc. to calculate difference in required time and distance to the object to be measured in cooperation with a calculating section 33. In other words, a measurement amount calculating section 39 for calculating the difference in required time and the distance to the object to be measured is constituted with the calculating section 33 and the calculating circuit section 21. The output from the comparator 19 or the timing signals r', $o'_1$, $o'_2$ are inputted on one hand to the wave number counter/interrupt generating circuit 26 and used for roughly measuring the time difference or distance, and on the other hand used for fine measurement as sampling clocks of the A-D converter 24 with two circuits.

Next will be described the rough measurement and end notification of importing timing signals.

When all the measurement light timing signals $O'_1$, $o'_2$ are imported, the wave number counter/interrupt generating circuit 26 notifies a CPU 34 (central processing unit) of an end of importing the timing signals, and the CPU 34 receives the notification (step S01). Rough measurement is started upon or after the notification. However, the number of measurement light timing signals is not constant as it varies with the level of light amount from the target. Therefore, it is designed to predetermine an effective maximum number of measurement light timing signals and give a notification of ending timing signal import to the CPU 34 when a period of time lapses from the first measurement light timing signal $o'_1$ in which the effective maximum number of signals may be received. Incidentally, while the explanation here is given on the premise that the target as an object to be measured always exists; in reality, cases may be conceivable in which received light signals due to reflection from the target cannot be received for some reason or other, and as a result no measurement light timing signals are generated. This case may be coped with by not determining the end of timing signal import based on the number of the measurement light timing signals $o'_1, o'_2, \ldots$ but by setting a waiting time corresponding to the maximum distance measurement range of the instrument immediately after receiving the reference light timing signal r', and notifying the CPU 34 of the end of timing signal import irrespective of the presence or absence of the measurement light timing signals.

The wave number counter/interrupt generating circuit 26 counts the total number T of generated timing signals (step S02). The first count is generated with the reference light timing signal r'. The second and subsequent counts are generated with the measurement light timing signals $O'_1$, $o'_2$. In this embodiment, T=3.

Next, approximate periods of time from the reference light timing signal r' to the measurement light timing signals $o'_1$, $o'_2$ are measured. Clocks for reference are generated with the reference clock generating circuit 22. Using the number of clocks of the reference sine-cosine signal (FIGS. 4(d), 4(e)) produced with the reference sine-cosine signal generating circuit 23, the number of clocks is counted with the wave number counter/interrupt generating circuit 26 during the time from the reference light timing signal r' to the measurement light timing signals $O'_1$, $o'_2$. The counted number of clocks Mn (with n being the ordinal number of measurement light signal) is held. In this embodiment, the number of clocks between r' and $o'_1$ is assumed to be $M_1$; and between r' and $o'_2$, $M_2$. Each number of clocks Mn counted here is combined with calculated value of fine measurement described later and used for calculating the difference in required time and distance to the object to be measured.

The resolution d of the rough measurement is determined by the equation (1) below, where fr (Hz) is the frequency of the reference signal produced with the reference sine-cosine signal generating circuit 23, with the velocity of light being assumed as $3 \times 10^8$ (m/sec).

$$d=(3\times10^8/fr)/2(m) \qquad (1)$$

Here, the reference signal frequency fr may be for example 90 MHz.

Next, collecting data for fine measurement will be described.

For the fine measurement, a reference sine signal and a reference cosine signal as the waveforms to be sampled are inputted to the A-D converter 24 with two circuits and converted into digital data. The two waveforms are simultaneously sampled according to the rise timing of the outputs r', $o'_1$, $o'_2$ of the comparator 19. The data (values) Dsx of the reference sine waveform and data (values) Dcx of the reference cosine waveform sampled are stored in the first memory 25.

Addresses, a11-a13, of the first memory 25 are produced with the address counter 27. The timing signals r', $o'_1$, $o'_2$ outputted from the comparator 19 may also be used as the sampling clocks for the address counter 27. Data Dsr and Dcr sampled with the timing signal r' are stored in the address a11. Likewise, data Ds1 and Dc1 sampled with the timing signal $o'_1$ are stored in the address a12; and data Ds2 and Dc2 sampled with the timing signal $o'_2$, in the address a13. Through the above process, a set of data [Dsr, Dcr] for the reference light and two sets of data [Ds1, Dc1] and [Ds2, Dc2] are stored in the first memory 25.

Next, determining if the received light signals are within an appropriate range will be described.

The data stored through the above process are useful for fine measurement as long as the light amounts of the reference light and measurement light are within the appropriate range of the light receiving circuit. To determine if the light amounts of the reference light and measurement light are appropriate, the peak output of the preamplifier 18 is held and the appropriateness is determined at that level.

The outputs r, $o_1$, $o_2$ of the preamplifier 18 are inputted to the peak holding circuit 32 and held for a certain period of time at a DC level corresponding to the peak value (as shown in FIG. 4(f)). Outputs of the peak holding circuit 32 corresponding to the outputs r, $o_1$, $o_2$ of the preamplifier 18 are Pr, P1, and P2. The DC level signals are inputted to the light amount detecting A-D converter 29. To sample signals with their peak-held values within the appropriate range, received timing signals $r'_1$, $o'_{11}$, $o'_{21}$ having passed through the first delaying circuit 28 (shown in FIG. 4(g)) are inputted as sampling clocks for the A-D converter 29. Light amounts (peak-held values) Pr, P1, and P2 are converted into digital data, and stored in the second memory 30. As for the address in the second memory 30, output of the same address counter 27 as with the first memory 25 for storing the measurement light timing signal data may be used. Therefore, in this embodiment, the peak-held value Pr sampled with the delayed output $r'1$ is stored in the address a21; the peak-held value P1 sampled with the delayed output $o'_{11}$, in the address a22; and the peak-held value P2 sampled with the delayed output $o'_{21}$, in the address a23.

The peak-held values Pr, P1, and P2 held by the peak holding circuit 32 must be reset after a certain period of time, so that succeeding signals may be received. In this embodiment, the outputs ($r'_2$, $o'_{12}$, and $o'_{22}$) of the comparator 19 having passed through the second delay circuit 31 are used as signals for the resetting.

The calculating section 33 is constituted with the CPU 34, etc. to perform calculations related to time difference and distance. It also works together with the peak holding circuit 32 etc. serving as a pulse selecting section 38 for selecting light pulses used in measuring time difference and distance from multiplex light pulses received with the light receiving section 9. That is, the pulse selecting section 38 is made up of: the calculating section 33, the peak holding circuit 32, the light amount detecting A-D converter 29, the second memory 30, and the second delay circuit 31, etc.

The peak-held values Pr, P1, and P2 related to the reception level stored in the second memory 30 are read by the CPU 34 in the calculating section 33 (step S03) If the peak-held values P1 and P2 of the measurement light are within a predetermined appropriate range of light amount level is determined, or if they are approximately equal to the peak-held value Pr of the reference light is determined. The ordinal number n of the measurement light timing signal of the data determined to be within the appropriate range is stored (step S04). In the case the measurement light signal $o_1$ has exceeded the dynamic range of the receiving circuit and has saturated, the CPU 34 determines from the peak-held value P1 stored in the address a21 that the signal is beyond the appropriate light amount. In the case the measurement light signal $o_2$ is within the appropriate light amount range, the CPU 34 determines from the peak-held value P2 stored in the address a22 that the light amount is appropriate. In this way, the CPU 34 determines that the second signal $o_2$ out of the plural number of measurement light signals $o_1$, $o_2$, $o_3$ is the appropriate one for measurement.

In this way, light pulses for use in calculating the difference in required time and the distance to the object to be measured are selected from the multiplex light pulses received with the light receiving section 9. The calculating section 33 in cooperation with the peak holding circuit 32, the light amount detecting A-D converter 29, the second memory 30, and the second delay circuit 31, etc. serves the function of the pulse selecting section 38. The ordinal number of the measurement light signal $o_2$ determined to be appropriate for measurement is stored with an ordinal number n counted assuming the first signal $o_1$ is the first one, or with the ordinal number n of the measurement light timing signal. In this embodiment, n=2. While the ordinal number here is provided in the order of the multiplex light pulses generated with the multiplex pulse generation section Mp1 in place of the order of receiving the light pulses, the order of receiving the light pulses may be used.

Next will be described the fine measurement.

Next, the CPU 34, using the data collected as described above, calculates the distance to the object to be measured.

As the measurement light signal $o_2$ is determined to be appropriate for measurement, data used for calculation are: the number of clocks M2 for rough measurement, and the reference sine-cosine signal data [Dsr, Dcr] and [Ds2, Dc2] for fine measurement. The CPU 34 reads these data from the wave number counter/interrupt generating circuit 26 and the first memory 25 (step S05).

The distance to the object to be measured to be finally known is L in FIG. 4 (the distance corresponding to the time difference between the time for the measurement light signal $o_1$ traveling through the measurement light path F2 and the time for the reference light signal r traveling through the reference light path F1). However, because the measurement light signal $o_1$ is inappropriate in light amount, L' (the distance corresponding to the time difference between the time for the measurement light signal $o_2$ traveling through the measurement light path F2 and the time for the reference light signal r traveling through the reference light path F1) is calculated. After that, subtraction is made by Lf×(n−1) corresponding to the delay due to the optical fiber length Lf of the multiplex reflection optical fiber Mp1. Incidentally in this case, it is assumed that the length of the reference fiber 5 in the reference light path F1 is equal to the sum of lengths of the light emitting fiber 11 and the light receiving fiber 15 of the normal measurement light path. First, a rough distance Lm is calculated from the number of clocks M2 counted in advance for rough measurement using the equation (2) (step S06).

$$Lm = \{(3 \times 10^8/fr) \times M2\}/2 \quad (2)$$

Incidentally, dividing by 2 is carried out because the measurement light makes a round trip between the instrument and the object to be measured.

Next, the distances Lr and Ln (L2 here) of the reference light signal and the measurement light signal within one period are calculated using the equations (3) and (4) (step S07).

$$Lr = \{(3 \times 10^8/fr) \times (1 - \tan^{-1}(Dsr/Dcr)/2\pi\}/2 \quad (3)$$

$$\begin{aligned}Ln &= L2 \\ &= \{(3 \times 10^8/fr) \times (\tan^{-1}(Ds2/Dc2)/2\pi\}/2\end{aligned} \quad (4)$$

From the equations (2)-(4), L' is calculated with the equation (5) (step S08).

$$L' = Lm + Lr + Ln \quad (5)$$

As the length Lf of the optical fiber is predetermined, the distance L to the object to be measured to be finally obtained is expressed with the equation (6) (step S09).

$$L = L' - Lf \times (n-1) \quad (6)$$

The distance L to be measured is determined through the above calculation.

After finishing a series of the steps, the CPU 34 resets the wave number counter/interrupt generating circuit 26, the address counter 27, the first memory 25, and the second memory 30 in preparation for next light reception.

Incidentally, in order to determine not the distance L to the object to be measured but the difference in required time, calculation should be made using the equations (2)-(4) without multiplying by the velocity of light ($3 \times 10^8$/fr). As a result, the difference in required time to be obtained coincides with the distance L to the object to be measured obtained with the equation (6) divided by the velocity of light.

Next, a second embodiment of the invention will be described. While the first embodiment is described as an example in which the multiplex reflection optical fiber is used as the light emitting fiber, this example is described as an example in which the multiplex reflection optical fiber is used as the light receiving fiber.

FIG. 6 shows a constitution example of an optical circuit in which a multiplex reflection optical fiber is provided on the light receiving side. The constitution shown in FIG. 6 is different from that shown in FIG. 1 only in that the multiplex reflection optical fiber Mp1 is used as the light receiving fiber 15 rather than the light emitting fiber 11; otherwise the constitution is the same as in the first embodiment.

Figure 7A:
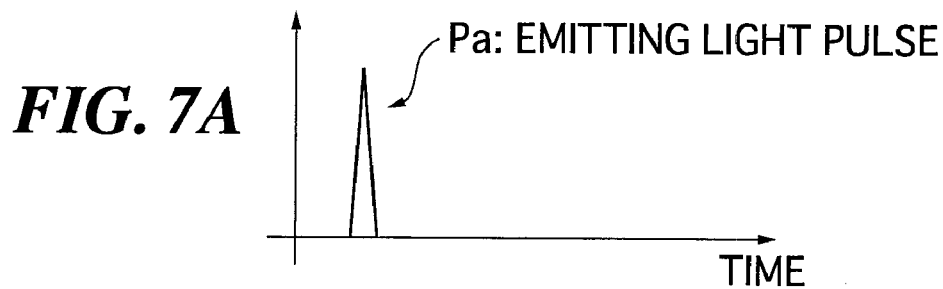
FIG. 7A through 7C show the state of light pulses in the optical circuit in the second embodiment.
Figure 7B:
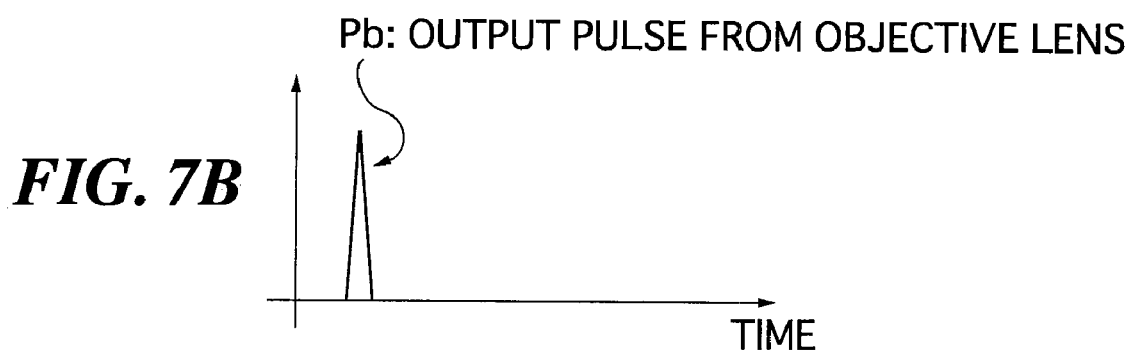
Figure 7C:
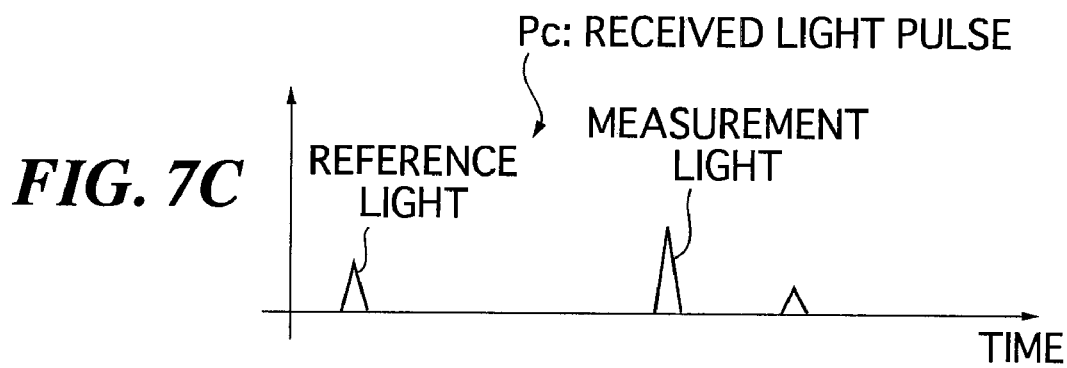

FIG. 7 shows the state of light pulses at various parts of the optical circuit. As shown in FIG. 7A, the emitting pulse Pa emanating from the light emitting section 1 is a single pulse. As shown in FIG. 7B, the output pulse from objective lens Pb emitted from the light emitting fiber 11 to the object to be measured is also a single pulse. As shown in FIG. 7C, the pulse Pc received on the light receiving section 9 appears first as a single pulse having passed through the reference light path F1. Then, as the pulse is reflected from the object to be measured and travels through the multiplex reflection optical fiber Mp1, a row of pulses come out with their light amount attenuating at a constant rate. Therefore, it is possible to select one of the pulses in the row that is the nearest in light amount to the basis-setting reference light and to measure the difference in required time or the distance to the object to be measured without light amount adjustment.

Next, a third embodiment of the invention will be described. This embodiment is based on the first or second embodiment, and has the function of compensation for fine measurement.

First, compensation is made for variation in the time difference or the distance due to light amount error. In other words, as the strict light amount difference between the reference light and the measurement light is calculated and the error in the time difference or the distance caused by the light amount difference is compensated, it is possible to obtain measurements of higher accuracy. In this case, the measurement amount calculating section 39 should be provided with a compensation table storing the relationship between the light amount difference and the compensation amount as compensation data corresponding to the levels of received light signals, and carry out compensation according to the compensation table every time of measurement.

Further, it is possible to improve measurement accuracy by averaging measurement values using a plural number of optimum pulses. That is, while the first and second embodiments are described as cases in which the number of optimum signals of the measurement light is only one, it is also possible to generate a plural number of measurement light signals with their received light amount falling within an appropriate range by properly setting the attenuation rate of the multiplex reflection optical fiber MP1. In this case, calculation of time difference or distance is made for each measurement light signal with an appropriate received light amount like in the first and second embodiments, the above compensation is made, and obtained results are all averaged, and the average is used as the final result. Thus, a more stabilized measurement result is obtained with additional effect of averaging.

Incidentally, the above compensation and averaging may be made in reverse order, or only one of them may be made.

Next, a fourth embodiment of the invention will be described. This embodiment, like the third embodiment, is based on the first or second embodiment, and has the compensating function for fine measurement. While error compensation is made for the light amount difference in the third embodiment, in this embodiment the error compensation is made for the amplitude ratio. The measurement amount calculating section 39 should be provided with a compensation table storing the relationship between the amplitude ratio and the compensation amount as compensation data corresponding to the levels of received light signals, and carry out compensation according to the compensation table every time of measurement.

FIG. 8 shows a compensation table example of this embodiment. The compensation table shows error compensation amount (in mm) relative to the amplitude ratio. This is a compensation amount table relative to the amplitude ratio made by actually measuring the time difference or distance for targets located at known distances.

The amplitude ratio is defined as (the amplitude of electric signal produced using measurement light) divided by (the amplitude of electric signal produced using reference light).

Assuming that the second pulse is used for calculating time difference or distance, the amplitude ratio G is expressed with the equation (7).

$$G=P2/Pr \qquad (7)$$

The calculating section 33 selects two or several values approximating the value of the G above and calculates a compensation amount dg for the amplitude ratio G from the selected values by linear approximation (when two values are selected) or non-linear approximation (when more than two values are selected). Further, finally compensated measurement value is determined by adding the compensation amount dg to the distance L to be measured obtained with the equation (6). In order to obtain the time difference, the compensation amount dg and the measured distance L should be divided by the velocity of light.

Compensating the error for the amplitude ratio as described above will provide measurement results of higher accuracy like in the third embodiment. Averaging may also be used together with this compensation.

Next, a fifth embodiment of the invention will be described. While the first through fourth embodiments are described as examples in which the multiplex reflection optical fiber Mp1 is used as a multiplex pulse generating section, this embodiment is described as an example provided with a bypass as a multiplex pulse generating section through which part of incident light beam is bypassed.

Figure 9:
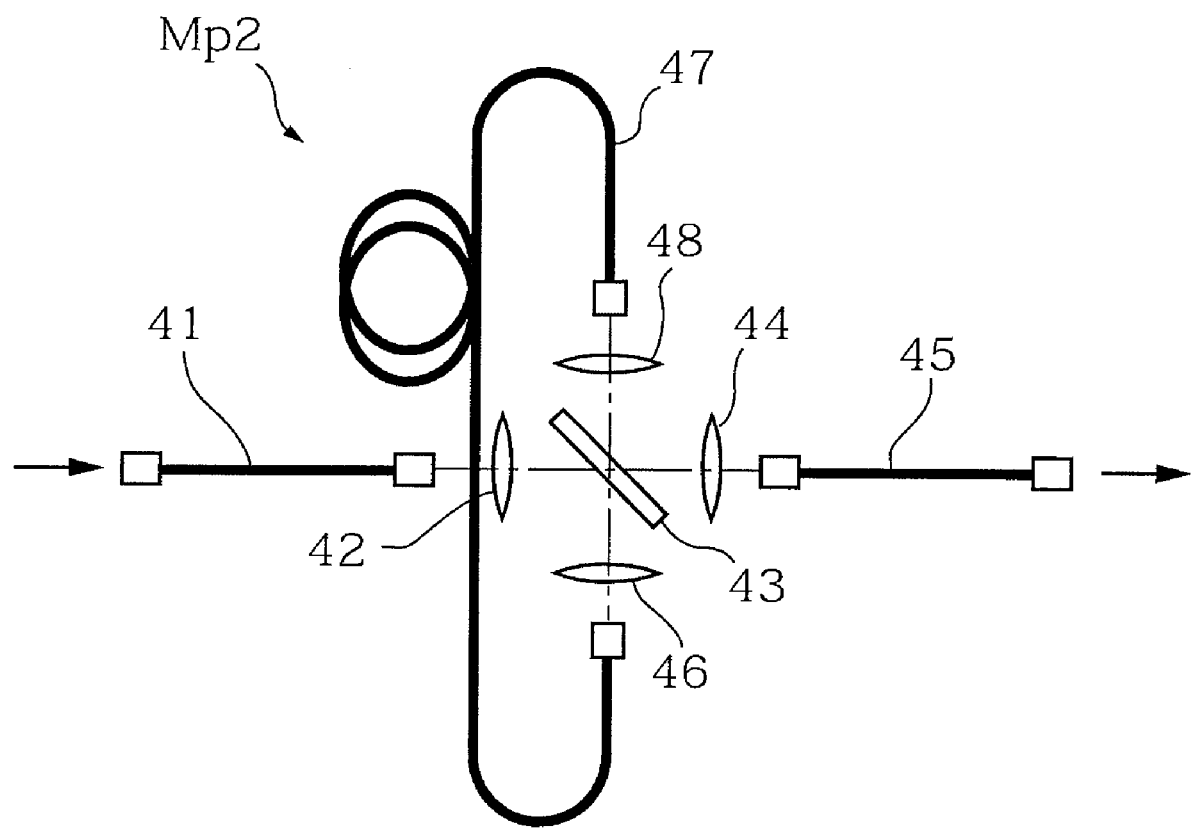
FIG. 9 shows a constitution example of a multiplex pulse generating section in a fifth embodiment.

FIG. 9 shows a constitution example of a multiplex pulse generating section Mp2 in the fifth embodiment. FIG. 9 shows an example in which a partially reflecting mirror (semitransparent mirror) 43 is used to branch light signals off the normal measurement light path into a bypass, make the bypassed light signals travel around, and return from the bypass to the normal measurement light path. This method is to put the semitransparent mirror 43 in the middle of an input fiber 41 and an output fiber 45 to branch part of the input light beam and guide it to a feedback fiber (bypass) 47. The light guided into the feedback fiber 47 travels round through it. After the travel, the light is again reflected with the semitransparent mirror 43 to the output fiber 45. The measurement light first traveling through the semitransparent mirror 43 but not traveling through the feedback fiber 47, or the measurement light traveling through the normal measurement light path, comes out of the output fiber 45 first as a light pulse of the greatest light amount. After that, the light beam traveling through the feedback fiber 47 comes out as a row of pulses with their light amount attenuating at a constant rate in the order of measurement light beams traveling through the feedback fiber 47 for one, two, ... rounds. In the figure are shown: collimator lenses 42, 48 for forming parallel light; and condenser lenses 44, 46 for condensing light to the optical fibers 45, 47.

Constituting the multiplex pulse generating section Mp2 in this way makes it possible to generate multiplex pulses free from loss of energy. That is, with the multiplex reflection optical fiber Mp1 in the first through fourth embodiments, light leaks out at the fiber end face depending on the transmissivity, resulting in low light energy use efficiency. The constitution using the half-mirror above, however, makes it possible to prevent light from leaking out of the system and bring about a working efficiency of substantially 100 percent.

Next, a sixth embodiment of the invention will be described. This embodiment is described as an example, like the fifth embodiment, having a bypass as a multiplex pulse generating section for bypassing part of the incident light beam.

Figure 10:
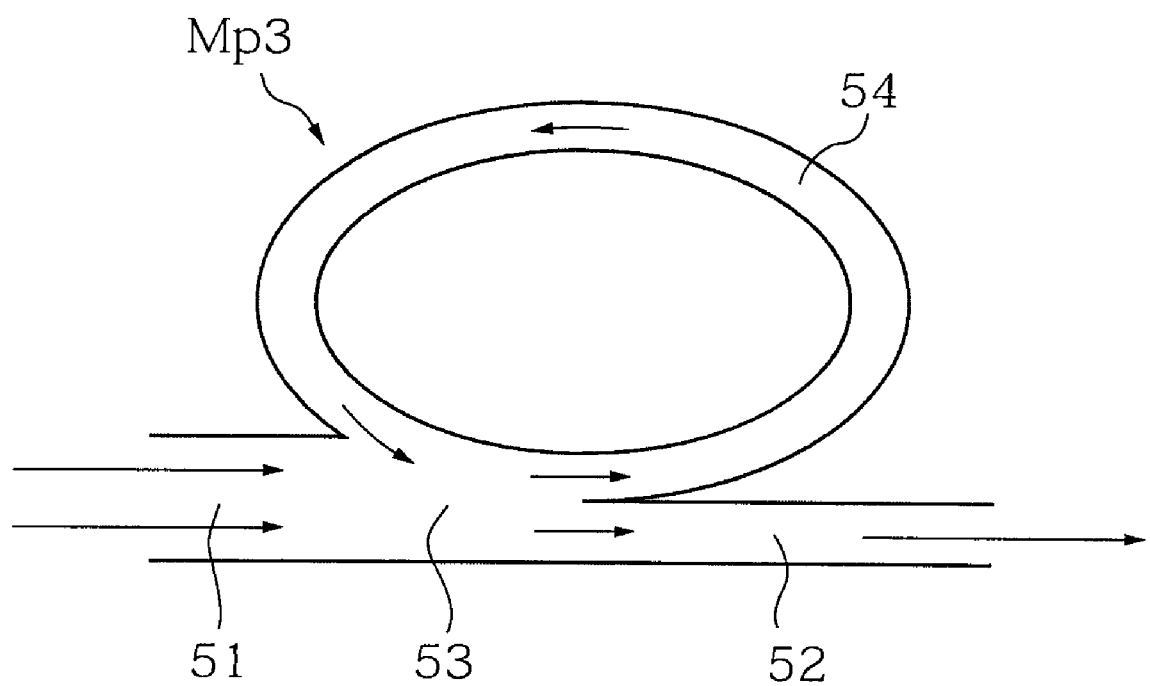
FIG. 10 shows a constitution example of a multiplex pulse generating section in a sixth embodiment.

FIG. 10 shows a constitution example of a multiplex pulse generating section Mp3 in the sixth embodiment. FIG. 10 shows an example in which a light coupler 53 is used to branch light signals off the normal measurement light path to the bypass, make the branched light beam travel through the bypass, and bring back the light signals from the bypass to the normal measurement light path. As the light coupler 53, a fiber bifurcating in the middle may be used. In this example, the light coupler 53 is interposed between an input fiber 51 and an output fiber 52 to branch part of the light beam to the bypass made of an optical fiber loop 54, to make the branched light beam travel through the optical fiber loop 54 and return through the light coupler 53 to the normal measurement circuit. The measurement light not traveling through the optical fiber loop 54, or the measurement light traveling through the normal measurement light path, comes out of the output fiber 52 first as a light pulse of the greatest light amount. The measurement light beam passing through the optical fiber loop 54 comes out as a row of pulses with their light amount attenuating at a constant rate in the order of measurement light beams traveling through the optical fiber loop 54 for one, two, ... rounds. Such a multiplex pulse generating section Mp3 can also generate multiplex pulses with a working efficiency of as high as 100 percent.

While embodiments of the invention are described above, it is apparent that the invention is not limited to the above embodiments. Rather, the embodiments may be appropriately modified without departing from the gist of the invention.

For example, while the multiplex reflection optical fiber is used as the light emitting fiber or the light receiving fiber in the first through fourth embodiments, the multiplex reflection optical fiber may be used in part of the light emitting fiber or the light receiving fiber. Further, while the first through sixth embodiments are described as examples in which a single multiplex pulse generating section is used, it may be used in a plural number, or in a nesting constitution. In these cases, as the pulses are generated in a plural number of rows, the generated multiplex pulses do not always come out with their light amount sequentially attenuating at a constant rate.

Further, the above embodiments are described as examples in which: the length of the reference fiber 5 in the reference light path F1 is equal to the sum of the lengths of the light emitting fiber 11 and the light receiving fiber 15 in the normal measurement light path, the difference between the time required for the measurement light to travel through the measurement light path F2 and the time required for the reference light to travel through the reference light path F1 is equal to the difference between the times of receiving the measurement light and the reference light, and the distance L to be measured is determined from the difference between the light receiving times. However, in the case the fiber lengths are not in the above relationship, compensating the time difference or distance corresponding to the optical length difference will do. Also in the case errors due to the above relationship occur in the interface section IN, compensating the time difference or distance corresponding to the optical length difference will do.

While the above embodiments are also described as examples in which the ordinal numbers of receiving the light pulses are provided in the order of generating the multiplex light pulses with the multiplex pulse generating section, it is apparent that the ordinal numbers may also be provided in the order of receiving light pulses. Moreover, when a constitution is employed in which a mirror is interposed between the lens 14 and the object to be measured in the interface section IN, and further this mirror is made rotatable about the optical axis of the lens 14, distances to objects to be measured present 360 degrees around the instrument may be measured. It is also possible to use, in place of PLD, the other laser source or other light emitting element or light source as the light emitting section; and use, in place of APD, the other light receiving element and light receiving equipment as the light receiving section.

INDUSTRIAL APPLICABILITY

This invention may be used in instruments that receive light pulses reflected from a target to measure time difference or distance.

The invention claimed is:

1. A surveying instrument comprising:
   a light emitting section for emitting light a pulse;
   a beam splitter for branching the light pulse emitted from the light emitting section into a reference light and a measurement light;
   a reference light path for letting the reference light travel through;
   a part of a measurement light path for letting the measurement light travel through for irradiation on an object to be measured and letting the measurement light reflected from the object to be measured travel through, the part of the measurement light path having a multiplex pulse generating section for generating, from the measurement light, multiplex light pulses at different times with different intensities;
   a light receiving section for receiving the reference light from the reference light path and receiving the multiplex light pulses from the measurement light path;
   a light coupler for coupling together the light from the reference light path and the light from the measurement light path to guide the light from the reference light path and the light from the measurement light path to the light receiving section;
   a pulse selecting section for selecting, from the multiplex light pulses received with the light receiving section, a light pulse for use in measurement; and
   a measurement amount calculating section for calculating, according to the difference in light receiving time between the light pulse selected with the pulse selecting section and the reference light and according to the order of receiving the selected light pulse, a difference in required time between the time required for the measurement light traveling through a normal measurement light path and the time required for the reference light traveling through the reference light path, or for calculating a distance to the object to be measured.

2. The surveying instrument as recited in claim 1, wherein the multiplex light pulses generated at different times with different intensities are a row of pulses appearing at constant time intervals with their light amount sequentially attenuating at a constant rate.

3. The surveying instrument as recited in claim 1, wherein the pulse selecting section selects the light pulse for use in the measurement according to light levels of the received multiplex light pulses.

4. The surveying instrument as recited in claim 1, wherein the multiplex pulse generating section has a multiplex reflection optical fiber with each of its end faces having a reflecting part that lets part of incident light beam travel through while reflecting part of it.

5. The surveying instrument as recited in claim 4, wherein the reflecting part of the multiplex reflection optical fiber is formed with a filter of a specified reflectivity.

6. The surveying instrument as recited in claim 4, wherein the specified reflectivity is set depending on the relationship to a dynamic range of the instrument.

7. The surveying instrument as recited in claim 1, wherein the multiplex pulse generating section has a bypass for bypassing part of incident light beam.

8. The surveying instrument as recited in claim 7, wherein the multiplex pulse generating section branches part of the light beam off the normal measurement light path through a partially reflecting mirror, routes the branched light beam through the bypass, and guides the light beam back to the normal measurement light path through the partially reflecting mirror.

9. The surveying instrument as recited in claim 7, wherein the multiplex pulse generating section branches part of the light beam from the normal measurement light path to the bypass made of an optical fiber loop through a light coupler, lets the branched light beam travel round through the optical fiber loop, and guides the light beam back to the normal measurement light path through the light coupler.

10. The surveying instrument as recited in claim 1, wherein the measurement amount calculating section has a compensation table storing compensation data corresponding to light level of the received light, and uses the compensation table to compensate the difference in required time or the distance to the object to be measured.

11. The surveying instrument as recited in claim 1, wherein the object to be measured is a target.

* * * * *